(12) United States Patent
Verrett

(10) Patent No.: US 8,758,556 B2
(45) Date of Patent: Jun. 24, 2014

(54) COMPOSITION FOR INHIBITING CALCIUM SALT SCALE FORMATION

(75) Inventor: Sheldon Phillip Verrett, Rock Hill, MO (US)

(73) Assignee: Dequest AG, Zug (CH)

( * ) Notice: Subject to any disclaimer, the term of this patent is extended or adjusted under 35 U.S.C. 154(b) by 214 days.

(21) Appl. No.: 13/264,476

(22) PCT Filed: Mar. 16, 2010

(86) PCT No.: PCT/EP2010/053412
§ 371 (c)(1),
(2), (4) Date: Feb. 17, 2012

(87) PCT Pub. No.: WO2010/106077
PCT Pub. Date: Sep. 23, 2010

(65) Prior Publication Data
US 2012/0160438 A1    Jun. 28, 2012

(30) Foreign Application Priority Data
Apr. 7, 2009 (EP) ................................ 09157548

(51) Int. Cl.
| | |
|---|---|
| *D21C 3/02* | (2006.01) |
| *D21C 3/22* | (2006.01) |
| *D21C 11/10* | (2006.01) |
| *C02F 5/10* | (2006.01) |
| *C02F 5/14* | (2006.01) |
| *D21C 9/00* | (2006.01) |
| *C02F 103/28* | (2006.01) |

(52) U.S. Cl.
CPC .............. *D21C 3/226* (2013.01); *D21C 11/106* (2013.01); *D21C 9/008* (2013.01); *C02F 2103/28* (2013.01); *C02F 5/14* (2013.01); *Y10S 210/928* (2013.01)
USPC .................. 162/80; 162/36; 162/48; 162/72; 162/175; 252/175; 210/699; 210/928

(58) Field of Classification Search
CPC ...... D21C 11/106; D21C 3/226; D21C 9/008; C02F 2103/28; C02F 5/125; C02F 5/14; C02F 5/145; C02F 5/105
USPC ............... 162/16, 17, 29, 36, 48, 72, 80, 175; 252/175, 180, 181; 210/699, 700, 928; 536/123.1
See application file for complete search history.

(56) References Cited

U.S. PATENT DOCUMENTS

| | | | |
|---|---|---|---|
| 5,777,090 A | 7/1998 | Verraest et al. | |
| 6,613,899 B1 * | 9/2003 | Kuzee et al. | ................... 536/124 |
| 7,172,677 B2 | 2/2007 | Thompson et al. | |
| 7,300,542 B2 | 11/2007 | Thompson et al. | |

FOREIGN PATENT DOCUMENTS

| | | |
|---|---|---|
| EP | 1408103 A | 4/2004 |
| EP | 1743906 | 1/2007 |

(Continued)

*Primary Examiner* — Eric Hug
(74) *Attorney, Agent, or Firm* — Samuel Digirolamo; Husch Blackwell LLP

(57) ABSTRACT

A method for inhibiting the formation, deposition and adherence of calcium salt scale to metallic and other surfaces in the equipment, vessels and/or piping of a chemical pulp process facility comprising adding an effective scale inhibiting amount of a composition to the alkaline aqueous mixture in the digester of said chemical pulping process. Said composition consists of at least one phosphonate component (I) and at least one component (II) consisting of at least one carboxylated fructan compound.

14 Claims, 3 Drawing Sheets

Performance Ca inhibition curves in Kraft Cook
Na4HEDP (sodium salt of 1-hydroxyethylidene (1,1-diphosphonic acid) / carboxy methylinulin having DS of 2.5. - blend as inhibitor at various concentrations

(56) References Cited

FOREIGN PATENT DOCUMENTS

| | | | |
|---|---|---|---|
| EP | 2090645 A1 | | 8/2009 |
| WO | WO 98/25972 | * | 6/1998 |
| WO | WO99/42410 A1 | | 8/1999 |
| WO | WO 99/64716 A1 | | 12/1999 |
| WO | WO 2009/020546 | | 2/2009 |

* cited by examiner

COMPOSITION FOR INHIBITING CALCIUM SALT SCALE FORMATION

CROSS REFERENCE TO RELATED APPLICATIONS

This Preliminary Amendment is for a U.S. National Phase patent application of International Application PCT/EP2010/053412, filed 16 Mar. 2010, which claims the benefit of priority from European Patent Application No. 09157548.0 filed on Apr. 7, 2009, which claims the benefit of priority from U.S. Provisional Patent Application No. 61/160,876, filed Mar. 17, 2009. The disclosures of International Application PCT Application No. PCT/EP2010/053412, European Patent Application No. 09157548.0 and U.S. Provisional Application No. 61/160,876 are incorporated herein by reference. Please enter the following amendment prior to examination of the national phase patent application.

This invention relates to a composition and methods for inhibiting scale formation in aqueous alkaline systems of chemical pulping processes. The term "scale", "calcium scale" and "calcium salt scale" as used in the specification and claims herein shall always include without limitation calcium and magnesium salt scale, mainly their carbonate and sulphate salts, and any and all scale consisting of insoluble salts formed in the processes described herein, and the term "scaling" relates to the formation of "scale", mainly "calcium scale" and "calcium salt scale" as defined above. This invention further relates to a composition and methods for inhibiting formation, deposition and adherence of calcium and magnesium salt scale deposits in chemical pulping process equipment. More particularly, this invention relates to compositions and methods for inhibiting formation, deposition and adherence of calcium and magnesium salt scale deposits in the pulp digesters (herein mostly called "digester") and in the black liquor recovery area of a chemical pulping process. The terms "pulp digester" and "black liquor" are described in more detail below.

Paper is widely used worldwide in commerce and in homes and has a variety of uses. Pulp making is thus carried out on a large industrial scale worldwide to produce sufficient quantities of paper. Accordingly it is highly desirable that such pulp making operations be carried out in a cost effective, efficient operation with minimum manufacturing equipment downtime and minimum periods of reduced pulp making process equipment efficiency.

The basic steps in industrial pulp making are to convert plant fiber into chips, convert chips into pulp in a chemical pulping process using a digester, optionally bleach the pulp, wash the pulp, and transform the pulp into suitable paper which can be used in paper products such as writing paper, newsprint and paper for documents.

Typically, several chemical pulping processes are used in industrial pulp making operations. Well known industrial alkaline chemical pulping processes include the Kraft (or sulphate), soda and alkaline sulphite processes. The Kraft process makes the strongest fibers of any pulp producing process and is the most commonly used pulp making process in part due to its efficient recovery process for the cooking chemicals. While the present invention has the applicability to any of the above alkaline chemical pulping processes, it is particularly useful with the Kraft process and, as such, the Kraft process is described in more detail below.

Initially, suitable trees are harvested, debarked and then chipped into suitable size flakes or chips. These wood chips are sorted with the small and the large chips being removed. The remaining suitable wood chips are then charged to a digester which is a vessel or tank for holding the chips and an aqueous digesting composition and can be designed for either batch or continuous operation.

Illustratively, in batch type digester, wood chips and the digesting composition which is a mixture of "weak black liquor", the spent liquor from a previous digester cook, and a "white liquor", generally a solution of sodium hydroxide and sodium sulfide, that is either fresh or from the chemical recovery plant, is pumped into the digester. In the cooking process lignin, which binds the wood fibers together, is dissolved in the white liquor forming pulp and black liquor.

The digester is sealed and the wood chips and the digesting composition are heated to a suitable cook temperature under high pressure. After an allotted cooking time at a particular temperature and pressure ("H-factor") in the digester, the digester contents (pulp and black liquor) are transferred to a holding tank. The pulp in the holding tank is transferred to brown stock washers while the liquid (black liquor formed in the digester) is sent to the black recovery area, i.e. black liquor evaporators. The black liquor is evaporated to a high solids content, usually 60-80% solids, using a multiple effect evaporator, for example. The higher the solids content, the more difficult it is to pump the black liquor and the more scale problems the pulp mill will have. One of the most troublesome scale is calcium and magnesium salt scale, mainly their carbonate scale which forms in various areas of the pulp mill, including the digester, the black liquor evaporator area, and the brown stock washing area.

Most commercial mills use multiple effect evaporators ("MEE") as the black liquor evaporators. These evaporators generally range from four to eight effects in length. Generally, undesirable scaling occurs in only one or two effects. Currently, most mills do not use any scale inhibitor but rather contend with the scale problem by shutting down the black liquor evaporator section and washing out the scale with hot acid, i.e. acid cleaning. This hot acid boil out adversely affects papermill production and is a concern because the acid used is corrosive to mill piping and equipment.

The Kraft cook is highly alkaline, usually having a pH of 10 to 14, more particularly 12 to 14. The digesting composition contains a large amount of sodium sulfide, which is used as an accelerant to increase the delignification rate of the cook. This works to release the lignin in the wood chips and thus the cellulose becomes available as pulp.

The combination of operating conditions in the Kraft process is conducive to scale formation and deposition and increases the propensity of the scale to form, deposit and adhere to metallic and other surfaces within which it comes in contact. Under such process conditions, calcium and magnesium and minor amounts of other ions present in the water and leached from the wood in the Kraft process can react with carbonate and produce rather rapid scaling with the deposition of calcium and magnesium carbonate scale. Such scale is frequently deposited in the digester, piping, heat exchangers etc., all of which have surfaces on which the calcium and magnesium carbonate can deposit and adhere. Such deposition builds up over time and can result in undesirable premature shutdowns downstream on the pulp making manufacturing line to remove scale deposits by hot acid washing.

EP-A 1 408 103 discloses a composition for detergent or bleaching applications, said composition consisting of at least one phosphonate component and at least one component consisting of carboxylated fructan compounds.

U.S. Pat. No. 5,777,090 discloses the use of inulin compounds as an alternative to phosphonate compounds used in a formulation for preventing scale formation in industrial processes.

U.S. Pat. No. 7,172,677 discloses that inhibition of calcium scale under conditions found in pulp digesters may be accomplished by employing a specific composition to be added to the digester of a chemical pulping process. Said composition comprises at least one phosphonate selected from compounds having the formula (I) $X_2NCH_2PO_3M_2$, amine oxides of the phosphonates of formula (I), and compounds having the formula (II) $(Y)(R')(OH)C$—$PO_3M_2$ or mixtures thereof. M is independently selected from hydrogen, alkali metal, alkaline earth metal or ammonium, X is independently selected from H, R, or —$CH_2PO_3M_2$ wherein R is an alkyl group or —$NX_2$ substituted alkyl group having 2 to 6 carbon atoms, R' is an alkyl group having 1 to 17 carbon atoms and optionally branched and optionally unsaturated, and Y is selected from —$PO_3M_2$, H or R'.

U.S. Pat. No. 7,300,542 discloses a method for inhibiting calcium salt scale formation in alkaline chemical pulping processes by adding at least one phosphonate to a black liquor of said chemical pulping process. The phosphonate is selected from compounds having the formula (I) $M_2O_3P$—$CH_2$—$N(R^1)$—$(CH_2)_m$—$N(R^2)$—$CH_2PO_3M_2$, (II) $R^3$—$C(OH)(PO_3M_2)_2$, (III) $N$—$(CH_2PO_3M_2)_3$, (IV) $C(CH_2CH_2$—$COOM)(CH_2$—$COOM)(COOM)(PO_3M_2)$, (V) amine oxides of phosphonates of formulas (I) and (III), or mixtures thereof, wherein M is independently selected from hydrogen, alkali metal, alkaline earth metal or ammonium, $R^1$ and $R^2$ are independently selected from —$CH_2PO_3M_2$ or —$(CH_2)_n$—$N$—$(CH_2PO_3M_2)_2$, m is 2 or 3, n is 2 or 3, and $R^3$ is an alkyl group having 1 to 17 carbon atoms and $R^3$ is optionally branched and optionally unsaturated.

Both U.S. patents report on the efficacy of organo-phosphonates as anti-scalants for calcium salts in the Kraft digester and the Kraft black liquor evaporators. Both patents indicate that under the extreme alkaline conditions of the chemical pulping process specific organo-phosphonates and mixtures thereof may prevent formation of calcium salt scale. The results further indicate the optimum performance of these products fall within a rather low threshold range of the concentration of the products employed differing for each product. Many of these products indicate performance levelled out around 100 ppm and even less for others. Using higher concentrations of such products do not lead to an improved calcium carbonate inhibition. This is why the technology proposed by these prior art references leaves room for improvement.

Therefore, enhanced methods and compositions for inhibiting the formation, deposition and adherence of scale to metallic surfaces particularly in commercial chemical pulp processing equipment are highly desired.

It is an object of this invention to provide a composition for use in a chemical pulp process inhibiting the formation, deposition and adherence of calcium salt scale to metallic and other surfaces in the equipment, vessels and/or piping of a chemical pulp process facility. It is yet another object of this invention to provide a method for inhibiting the formation, deposition and adherence of calcium salt scale to surfaces in the equipment, vessels and/or piping of a chemical pulp process facility. It is still a further object of this invention to find organo-phosphonate products leading to improved effects with regard to inhibiting calcium salt scale formation especially inhibiting calcium carbonate precipitation.

These and other objects are achieved by the invention which is described in more non-limiting detail hereinafter.

Figure 1:
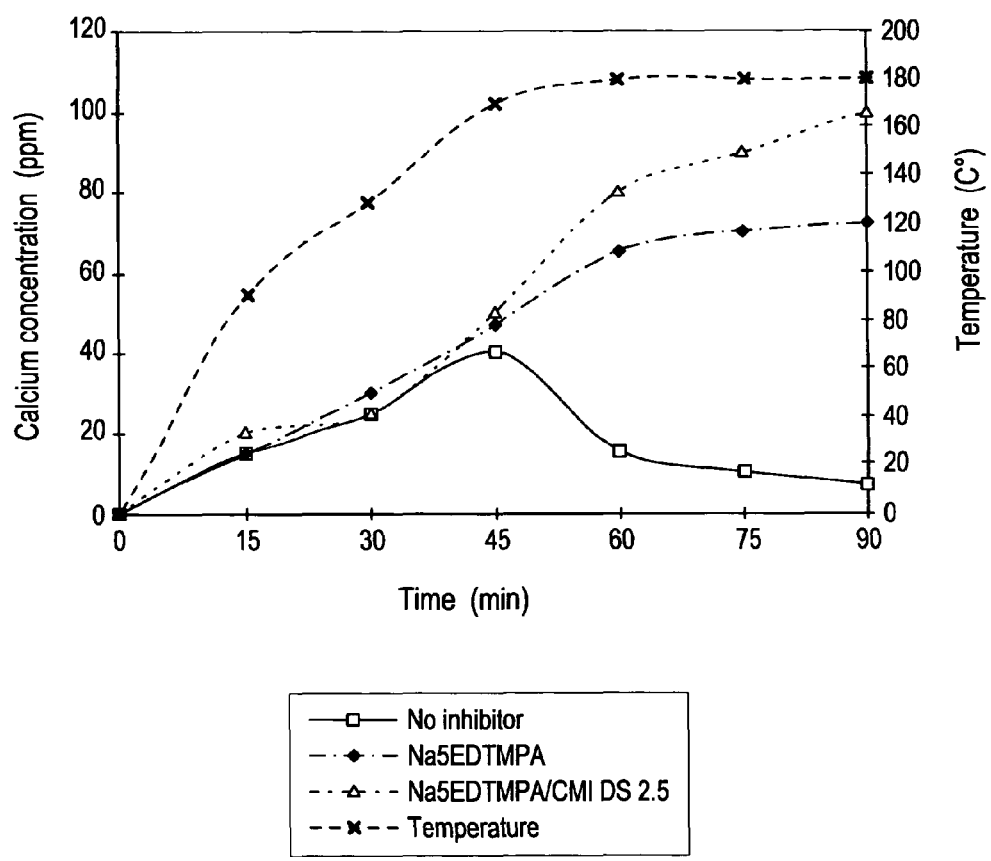
FIG. 1 is a graphical presentation of the results obtained by the procedure of Example 1 indicating the amount of calcium contained in the white liquor of a Kraft digester over time and temperature range of the digestion process wherein the white liquor contains no inhibitor and wherein the white liquor contains 100 ppm of various calcium scale inhibitors.

These objects are achieved by the method for inhibiting calcium salt scale formation in chemical pulping process comprising adding an effective scale inhibiting amount of a composition consisting of at least one phosphonate component (I) selected from one of the compounds (i), (ii), (iii) and (iv), and at least one component (II) consisting of a carboxylated fructan compound to the alkaline aqueous mixture in the digester of said chemical pulping process or to the black liquor of a chemical pulping process, wherein compound (i) is at least one aminoalkylene phosphonic acid, or its corresponding aminoalkylene phosphonate salt, selected from compounds having the general formula

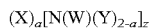

wherein X is selected from $C_1$-$C_{200,000}$, preferably $C_1$-$C_{50,000}$, most preferably $C_1$-$C_{2,000}$, linear, branched, cyclic or aromatic hydrocarbon radicals, optionally substituted by one or more $C_1$-$C_{12}$ linear, branched, cyclic or aromatic groups (which radicals and/or groups can be) optionally substituted by OH, COOH, COOG, F, Br, Cl, I, OG, $SO_3H$, $SO_3G$ and SG moieties; $ZPO_3M_2$; $[V$—$N(K)]_n$—K; $[V$—$N(Y)]_n$—V or $[V$—$O]_x$—V; wherein V is a $C_{2-50}$ linear, branched, cyclic or aromatic hydrocarbon radical, optionally substituted by one or more $C_{1-12}$ linear, branched, cyclic or aromatic groups (which radicals and/or groups are) optionally substituted by OH, COOH, COOR', F, Br, Cl, I, OR', $SO_3H$, $SO_3R'$ or SR' moieties; wherein R' is a $C_{1-12}$ linear, branched, cyclic or aromatic hydrocarbon radical, wherein G is selected from $C_1$-$C_{200,000}$, preferably $C_1$-$C_{50,000}$, most preferably $C_1$-$C_{2,000}$, linear, branched, cyclic or aromatic hydrocarbon radicals, optionally substituted by one or more $C_1$-$C_{12}$ linear, branched, cyclic or aromatic groups (which radicals and/or which groups can be) optionally substituted by OH, COOH, COOR', F, Br, Cl, I, OR', $SO_3H$, $SO_3R'$ and SR' moieties; $ZPO_3M_2$; $[V$—$N(K)]_n$—K; $[V$—$N(Y)]_n$—V or $[V$—$O]_x$—V; wherein Y is $ZPO_3M_2$, $[V$—$N(K)]_n$—K or $[V$—$N(K)]_n$—V; and x is an integer from 1-50,000; z is from 0-200,000, whereby z is equal to or smaller than the number of carbon atoms in X, and a is 0 or 1; n is an integer from 0 to 50,000; z=1 when a=0; and X is $[V$—$N(K)]_n$—K or $[V$—$N(Y)]_n$—V when z=0 and a=1; Z is a $C_{1-6}$ alkylene chain; M is selected from H and from alkali, earth alkali and ammonium ions, preferably from sodium, potassium and protonated amines; W is selected from H, X and $ZPO_3M_2$; K is $ZPO_3M_2$ or H whereby K is $ZPO_3M_2$ when z=0 and a=1 or when W is H or X; with the proviso that the aminoalkylene phosphonic acid (and its corresponding amino alkylene phosphonate) contains, at least, two phosphonic acid (or corresponding aminoalkylene phosphonate) groups, wherein compound (ii) is at least one (non-amino) alkylene phosphonic acid, or the corresponding (non-amino) alkylene phosphonate, having the formula:

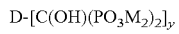

$D\text{-}[C(OH)(PO_3M_2)_2]_y$, wherein D is selected from $C_1$-$C_{100}$ linear, branched, cyclic or aromatic hydrocarbon chain, optionally substituted by a $C_{1-12}$ linear, branched, cyclic or aromatic group (which chain and/or which group can be) optionally substituted by $SO_3H$, $SO_3J$, COOJ, OJ and SJ moieties; or $[V\text{—}O]_x\text{—}V$ wherein V is a $C_2$-$C_{50}$ linear, branched, cyclic or aromatic hydrocarbon radical, optionally substituted by one or more $C_1$-$C_{12}$ linear, branched, cyclic or aromatic groups (which radicals and/or groups are) optionally substituted by $SO_3H$, $SO_3R'$, $COOR'$, $OR'$ or $SR'$ moieties wherein J is selected from $C_1$-$C_{100}$ linear, branched, cyclic or aromatic hydrocarbon radicals, optionally substituted by one or more $C_1$-$C_{12}$ linear, branched, cyclic or aromatic groups (which radicals and/or groups can be) optionally substituted by $SO_3H$, $SO_3R'$, $COOR'$, $OR'$ or $SR'$ wherein $R'$ is a $C_{1-12}$ linear, branched, cyclic or aromatic hydrocarbon chain and x is an integer from 1-50,000; y is an integer from 1-50 whereby y is equal or smaller then the number of carbon atoms in D; and M is selected from H and from alkali, earth alkali and ammonium ions, preferably from sodium, potassium and protonated amines, wherein compound (iii) is at least one (non-amino) alkylene phosphonic acid, or its corresponding phosphonate, selected from phosphono-alkane-polycarboxylic acids and its corresponding salts based on alkali, earth alkali and ammonium ions, preferably sodium, potassium and protonated amines, wherein the alkane moiety is a $C_{3-20}$ linear, branched, cyclic or aromatic hydrocarbon chain and wherein the molar ratio of phosphonic acid radical to carboxylic acid radical is in the range of from 2:3 to 1:7, wherein compound (iv) is selected from linear or branched hydrocarbon chains having from 6 to 2,000,000 carbon atoms containing amino groups substituted by $ZPO_3M_2$, and/or -E-N(W)(Y), with respect to the hydrocarbon chain, in either terminal or branched positions whereby the molar ratio of the aminoalkylene phosphonic acid substituents to the number of carbon atoms in the hydrocarbon chain is in the range of from 2:1 to 1:40 whereby at least 30% of the available $NH/NH_2$ functionalities have been converted into the corresponding aminoalkylene phosphonic acid and/or into -E-N(W)(Y) substituted groups and wherein the alkylene moiety is selected from $C_{1-6}$; wherein E is selected from $C_1$-$C_{2,000}$, preferably $C_1$-$C_{500}$, most preferably $C_1$-$C_{200}$, linear, branched, cyclic or aromatic hydrocarbon radicals, optionally substituted by one or more $C_1$-$C_{12}$ linear, branched, cyclic or aromatic groups (which radicals and/or which groups can be) optionally substituted by OH, COOH, COOL, F, Br, Cl, I, OL, $SO_3H$, $SO_3L$ and SL moieties; $[V\text{—}N(Y)]_n\text{—}V$ or $[V\text{—}O]_x\text{—}V$ wherein V is a $C_{2-50}$ linear, branched, cyclic or aromatic hydrocarbon radical, optionally substituted by one or more $C_{1-12}$ linear, branched, cyclic or aromatic groups (which radicals and/or groups are) optionally substituted by OH, COOH, $COOR'$, F, Br, Cl, I, $OR'$, $SO_3H$, $SO_3R'$ or $SR'$ moieties wherein $R'$ is a $C_{1-12}$ linear, branched, cyclic or aromatic hydrocarbon radical; wherein L is selected from $C_1$-$C_{2,000}$, preferably $C_1$-$C_{500}$, most preferably $C_1$-$C_{200}$, linear, branched, cyclic or aromatic hydrocarbon radicals, optionally substituted by one or more $C_1$-$C_{12}$ linear, branched, cyclic or aromatic groups (which radicals and/or which groups can be) optionally substituted by OH, COOH, $COOR'$, F, Br, Cl, I, $OR'$, $SO_3H$, $SO_3R'$ and $SR'$ moieties; $ZPO_3M_2$; $[V\text{—}N(K)]_n\text{—}K$; $[V\text{—}N(Y)]_n\text{—}V$ or $[V\text{—}O]_x\text{—}V$; wherein Y is $ZPO_3M_2$, $[V\text{—}N(K)]_n\text{—}K$ or $[V\text{—}N(K)]_n\text{—}V$; and x is an integer from 1-50,000; n is an integer from 0 to 50,000; M is selected from H and from alkali, earth alkali and ammonium ions, preferably from sodium, potassium and protonated amines; W is selected from H, E and $ZPO_3M_2$; preferentially W is $ZPO_3M_2$; K is $ZPO_3M_2$ or H whereby K is $ZPO_3M_2$ when W is H or E; with the proviso that the aminoalkylene phosphonic acid (and its corresponding aminoalkylene phosphonate) contains, at least, two phosphonic acid groups (or corresponding aminoalkylene phosphonate groups), wherein the further component (II) consists of a carboxylated fructan component and is selected from the group of (a) carboxyalkylfructan, preferably carboxyalkylinulin, having from 1 to 4 carbon atoms in the alkyl moiety, (b) dicarboxyfructan, preferably dicarboxyinulin, having a degree of oxidation (DO) of from 10 to 100%, preferably 20 to 90%, expressed as a molar percentage of monosaccharide units converted into the corresponding dicarboxy analogues, (c) 6-carboxyfructan, preferably 6-carboxyinulin, and/or (d) fructan polycarboxylic acid, preferably inulin polycarboxylic acid, having a degree of carboxyalkylation or carboxyacylation of from 0.2 to 3.0, or (e) mixtures thereof.

The object of this invention is further achieved by the method for inhibiting calcium salt scale formation in an aqueous system in a selected alkaline chemical pulping process using a composition consisting of at least one of said phosphonate components (I) selected from at least one of the compounds (i), (ii), (iii) and (iv), and at least one of said carboxylated fructan components (II) consisting of at least one of said carboxylated fructan compounds (a), (b), (c), (d) and (e). comprising the following steps:

(a) determining the calcium salt scale inhibition profiles of the concentration of said composition and the amounts of its components consisting of at least one of said phosphonate components, and, further, at least one of said carboxylated fructan components and the process temperature as a function of time for said composition admixed with the aqueous digesting composition in a chemical pulping process digester, or with the black liquor composition recovered from the digester of said chemical pulping process, (b) identifying the calcium salt scale inhibition capability required by said selected chemical pulping process based on the process operating conditions of time, temperature and pressure, and the aqueous digesting composition, or the black liquor composition, respectively, (c) selecting the appropriate components of the composition, their amounts in the composition and use concentration of the composition to effectively inhibit calcium salt scale formation in said selected alkaline chemical pulping process when said composition is admixed with the aqueous digesting composition, or with the black liquor composition recovered from the digester, respectively, of said selected alkaline chemical pulping process based on steps (a) and (b), and (d) admixing the selected composition with the aqueous digesting composition during the digestion stage, or with the black liquor composition during the black liquor recovery stage of the chemical pulping process, respectively, in said alkaline chemical pulping process.

The object of this invention is further achieved by the method for inhibiting calcium salt scale formation in an aqueous system in a selected alkaline chemical pulping process using a composition consisting of at least one of said phosphonate components (I) selected from at least one of the compounds (i), (ii), (iii) and (iv), and at least one of said carboxylated fructan components (II) consisting of at least one of said carboxylated fructan compounds (a), (b), (c), (d) and (e). comprising the following steps:

(a) identifying the calcium salt scale inhibition capability required by said selected chemical pulping process based on the process operating conditions of time, temperature and pressure, and the aqueous digesting composition, or the black liquor composition, respectively, (b) selecting the appropriate components of the composition, their amounts in the composition and use concentration of the composition to effectively inhibit calcium salt scale formation in said selected alkaline chemical pulping process when said composition is admixed with the aqueous digesting composition, or with the black liquor composition recovered from the digester, respectively, of said selected alkaline chemical pulping process based on steps (a), and the calcium salt scale inhibition profiles of the concentration of the selected composition and the amounts of its components and the process temperature as a function of time for said selected composition admixed with the aqueous digesting composition, or with the black liquor composition recovered from the digester of said chemical pulping process, respectively, and (c) admixing the selected composition of phosphonate component(s) and carboxylated fructan component(s) with the aqueous digesting composition, or with the black liquor composition recovered from the digester, respectively, in said selected alkaline chemical pulping process, during the digestion stage stage of the chemical pulping process, or during the black liquor recovery stage of the chemical pulping process, respectively.

In the latter two methods for inhibiting calcium salt scale formation in an aqueous system in a selected alkaline chemical pulping process, and comprising said steps (a) to (d), and (a) to (c), respectively, the calcium salt scale inhibition profiles of the concentration of the composition and process temperature as a function of time for compositions admixed with the aqueous digesting composition in a chemical pulping process digester, or with the black liquor composition recovered from the digester, respectively, of said chemical pulping process, can be determined by conducting laboratory experiments, as described herein, or by conducting larger scale testing. As each chemical pulping process will vary depending on the type of wood being processed, the specific operating conditions used, the composition in the digester, or the composition of the black liquor, respectively, and the like, the specific composition of the invention and the required use concentration of same necessary to achieve the desired scale inhibition will be dependent upon the specific pulping process. By utilizing calcium salt inhibition profiles in conjunction with the calcium scale inhibition capability required by the selected chemical pulping process base on its process operating conditions of time, temperature and pressure, and the aqueous digesting composition, or black liquor composition, respectively, one of ordinary skill in the art may select the appropriate composition and its use concentration to effectively inhibit calcium salt scale formation in the selected chemical pulping process when the composition is admixed with the aqueous digesting composition or the black liquor composition, respectively, in the selected chemical pulping process.

The object of this invention is also achieved by the process for making paper pulp, comprising the steps of converting plant fibers into chips, converting the chips into pulp in a chemical pulping process in an alkaline, aqueous system in a digester, admixing an effective scale inhibiting amount of a composition with the aqueous system and/or with the black liquor recovered from the digester, wherein the composition consists of at least one of said component (I) selected from at least one of the compounds (i), (ii), (iii) and (iv), and at least one of said component (II) consisting of at least one of said carboxylated fructan compounds (a), (b), (c), (d) and (e). This process is preferably a Kraft process.

The object of the invention is also achieved by the composition for inhibiting calcium salt scale formation in an aqueous system in a selected alkaline chemical pulping process said composition consisting of at least one of said phosphonate components (I) selected from at least one of the compounds (i), (ii), (iii) and (iv), and at least one of said carboxylated fructan components (II) consisting of at least one of said carboxylated fructan compounds (a), (b), (c), (d) and (e).

As mentioned above, the term "calcium scale formation" as used herein always includes, without limitation, formation of calcium and magnesium salt scale, mainly their carbonate and sulphate salts, and any and all scale consisting of insoluble salts formed in the processes described herein.

Compound (i) described in more detail is at least one aminoalkylene phosphonic acid, or its corresponding aminoalkylene phosphonate salt, selected from compounds having the general formula

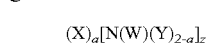

wherein X is selected from $C_1$-$C_{200,000}$, linear, branched, cyclic or aromatic hydrocarbon radicals; $ZPO_3M_2$; [V—N(K)]$_n$—K; [V—N(Y)]$_n$—V or [V—O]$_x$—V; wherein Z is a $C_{1-6}$ alkylene chain; M is selected from H and from alkali, earth alkali and ammonium ions, preferably from sodium, potassium and protonated amines; V is a $C_{2-50}$ linear, branched, cyclic or aromatic hydrocarbon radical; K is $ZPO_3M_2$ or H, whereby K is $ZPO_3M_2$ when z=0 and a=1 or when W is H or X; n is an integer from 0 to 50,000, and x is an integer from 1-50,000;

W is selected from H, X and $ZPO_3M_2$;

Y is selected from $ZPO_3M_2$, [V—N(K)]$_n$—K or [V—N(K)]$_n$—V;

z is from 0-200,000, whereby z is equal to or smaller than the number of carbon atoms in X, and a is 0 or 1;

z=1 when a=0; and X is [V—N(K)]$_n$—K or [V—N(Y)]$_n$—V when z=0 and a=1;

with the proviso that the aminoalkylene phosphonic acid (and its corresponding aminoalkylene phosphonate), contains, at least, two phosphonic acid (or corresponding phosphonate) groups.

The number of the units [N(W)(Y)$_{2-a}$], which is z, is not bigger than the number of the C atoms being present in the radicals, chains and units forming X. In other preferred embodiments z is equal or smaller than half the number of C atoms in X.

In preferred embodiments of compound (i) used in the invention, X as mentioned in the general formula of compound (i), is selected from $C_1$-$C_{50,000}$, most preferably $C_1$-$C_{2,000}$ linear, branched, cyclic or aromatic hydrocarbon radicals.

When X is selected from linear, branched, cyclic or aromatic hydrocarbon radicals, said radicals may be substituted by one or more $C_1$-$C_{12}$ linear, branched, cyclic or aromatic groups.

When X is selected from linear, branched, cyclic or aromatic hydrocarbon radicals and said radicals are substituted by one or more $C_1$-$C_{12}$ linear, branched, cyclic or aromatic groups, in such embodiments of compound (i) said radicals and/or groups can optionally be substituted by —OH, —COOH, —COOG, —F, —Br, —Cl—, —I, —OG, —SO$_3$H, —SO$_3$G, and —SG moieties. G is selected from $C_1$-$C_{200,000}$, preferably $C_1$-$C_{50,000}$, most preferably $C_1$-$C_{2,000}$ linear, branched, cyclic or aromatic hydrocarbon radicals which hydrocarbon radicals may optionally be substituted by $C_1$-$C_{12}$ linear, branched, cyclic or aromatic groups. That embodiment wherein G being said linear, branched, cyclic or aromatic hydrocarbon radicals and that hydrocarbon radicals are substituted by $C_1$-$C_{12}$ linear, branched, cyclic or aromatic groups, may be modified by substituting said hydrocarbon radicals and/or said $C_1$-$C_{12}$ linear, branched, cyclic or aromatic groups by —OH, —COOH, —COOR', —F, —Br, —Cl—, —I, —OR', —SO$_3$H, —SO$_3$R', and —SR' moieties, wherein R' is a $C_1$-$C_{12}$ linear, branched, cyclic or aromatic hydrocarbon radical. G may be further selected from ZPO$_3$M$_2$; [V—N(K)]$_n$—K; [V—N(Y)]$_n$—V or [V—O]$_x$—V wherein Z, M, V, K, Y, n and x have the meaning as defined above.

In a further embodiment of compound (i), V being a $C_{2-50}$ linear, branched, cyclic or aromatic hydrocarbon radical(s) as defined above, said radical(s) are substituted by one or more $C_1$-$C_{12}$ linear, branched, cyclic or aromatic groups wherein said $C_{2-50}$ linear, branched, cyclic or aromatic hydrocarbon radical and/or said $C_1$-$C_{12}$ linear, branched, cyclic or aromatic groups are optionally substituted by —OH, —COOH, —COOR', —F, —Br, —Cl—, —I, —OR', —SO$_3$H, —SO$_3$R', and —SR' moieties wherein R' is a $C_1$-$C_{12}$ linear, branched, cyclic or aromatic hydrocarbon radical as already defined above.

As described in more detail, the non-aminoalkylene phosphonate of compound (ii) is an alkylene phosphonic acid, or the corresponding alkylene phosphonate, having the general formula:

$$D\text{-}[C(OH)(PO_3M_2)_2]_y$$

wherein D is selected from $C_{1-100}$ linear, branched, cyclic or aromatic hydrocarbon chain, or [V—O]$_x$—V wherein V is a $C_2$-$C_{50}$ linear, branched, cyclic or aromatic hydrocarbon radical, and x is an integer from 1-50,000; y is an integer from 1-50 whereby y is equal or smaller than the number of carbon atoms in D; and M is selected from H and from alkali, earth alkali and ammonium ions, preferably from sodium, potassium and protonated amines.

The number of the units (PO$_3$M$_2$)$_2$], which is y, is not bigger than the number of C atoms being present in the chains, groups and radicals forming D. In other preferred embodiments y is equal or smaller than half the number of C atoms in D.

Optionally, when D is selected from $C_{1-100}$ linear, branched, cyclic or aromatic hydrocarbon chain it may be substituted by one or more $C_1$-$C_{12}$ linear, branched, cyclic or aromatic group(s) which chains and/or which groups can be optionally substituted by —COOJ, —OJ, —SO$_3$H, —SO$_3$J, and —SJ moieties wherein J is selected from $C_{1-100}$ linear, branched, cyclic or aromatic hydrocarbon radicals.

When D is selected from $C_{1-100}$ linear, branched, cyclic or aromatic hydrocarbon chain and that chain is substituted by one or more $C_1$-$C_{12}$ linear, branched, cyclic or aromatic group(s) which chains or groups are substituted by —COOJ, —OJ, —SO$_3$H, —SO$_3$RJ, and —SJ moieties and wherein J is selected from $C_{1-100}$ linear, branched, cyclic or aromatic hydrocarbon radicals, then these radicals of J may be substituted by one or more $C_1$-$C_{12}$ linear, branched, cyclic or aromatic group(s) and these radical(s) and/or group(s) can be optionally substituted by by —COOR', —OR', —SO$_3$H, —SO$_3$R', and —SR' moieties wherein R' is a $C_1$-$C_{12}$ linear, branched, cyclic or aromatic hydrocarbon chain.

When, alternatively, D is selected from [V—O]$_x$—V wherein V is selected from $C_2$-$C_{50}$ linear, branched, cyclic or aromatic hydrocarbon radicals, as mentioned above, said radical(s) may be substituted by one or more $C_1$-$C_{12}$ linear, branched, cyclic or aromatic group(s).

When D is selected from [V—O]$_x$—V and V is selected from said $C_2$-$C_{50}$ linear, branched, cyclic or aromatic hydrocarbon radicals and said radicals are substituted by one or more $C_1$-$C_{12}$ linear, branched, cyclic or aromatic groups, said radicals and/or groups may be substituted by —COOR', —OR', —SO$_3$H, —SO$_3$R', and —SR' moieties wherein R' is a $C_1$-$C_{12}$ linear, branched, cyclic or aromatic hydrocarbon chain.

In more detail, the non-aminoalkylene phosphonate of compound (iv) is selected from linear or branched hydrocarbon chains having from 6 to 2,000,000 carbon atoms containing amino groups substituted by ZPO$_3$M$_2$, and/or -E-N(W)(Y), with respect to the hydrocarbon chain, in either terminal or branched positions whereby the molar ratio of the aminoalkylene phosphonic acid substituents to the number of carbon atoms in the hydrocarbon chain is in the range of from 2:1 to 1:40 whereby at least 30% of the available NH/NH$_2$ functionalities have been converted into the corresponding aminoalkylene phosphonic acid and/or into -E-N(W)(Y) substituted groups and wherein the alkylene moiety is selected from $C_{1-6}$; wherein E is selected from $C_1$-$C_{2,000}$, linear, branched, cyclic or aromatic hydrocarbon radicals,

[V—N(Y)]$_n$—V or [V—O]$_x$—V, wherein V is a $C_{2-50}$ linear, branched, cyclic or aromatic hydrocarbon radical;

wherein Y is ZPO$_3$M$_2$, [V—N(K)]$_n$—K or [V—N(K)]$_n$—V;

Z is a $C_{1-6}$ alkylene chain;

x is an integer from 1-50,000;

n is an integer from 0 to 50,000;

M is selected from H and from alkali, earth alkali and ammonium ions, preferably from sodium, potassium and protonated amines;

W is selected from H, E and ZPO$_3$M$_2$; preferentially W is ZPO$_3$M$_2$;

K is ZPO$_3$M$_2$ or H whereby K is ZPO$_3$M$_2$ when W is H or E;

with the proviso that the aminoalkylene phosphonic acid, or its corresponding aminoalkylene phosphonate, contains, at least, two phosphonic acid groups, or phosphonate groups, respectively.

The radical E within the substituent E-N(W)(Y) mentioned in the definition of product (iv) preferably comprises $C_1$-$C_{500}$, most preferably $C_1$-$C_{200}$, linear, branched, cyclic or aromatic hydrocarbon radicals.

When the radical E is selected from linear, branched, cyclic or aromatic hydrocarbon radicals, said radicals may be substituted by one or more $C_{1-12}$ linear, branched, cyclic or aromatic group(s), said hydrocarbon radical(s) and/or said groups(s) may optionally be substituted by —OH, —COOH, —COOL, —F, —Br, —Cl, —I, —OL, —SO$_3$H, —SO$_3$L and/or —SL moieties wherein L selected from $C_{1-2,000}$, preferably $C_{1-500}$, most preferably $C_1$-$C_{200}$ linear, branched, cyclic or aromatic hydrocarbon radicals, ZPO$_3$M$_2$, [V—N (K)]$_n$—K,[V—N(Y)]$_n$—V or [V—O]$_x$—V wherein Z, M, V, K, Y, n and x have the meaning as defined above. When L is selected from said hydrocarbon radicals said radicals may be substituted by one or more $C_1$-$C_{12}$ linear, branched, cyclic or aromatic group(s) which radicals and/or groups can be optionally substituted by —OH, —COOH, —COOR', —F, —Br, —Cl, —I, —OR', —SO$_3$H, —SO$_3$R' and/or —SR' moieties wherein R' is a $C_1$-$C_{12}$ linear, branched, cyclic or aromatic hydrocarbon chain.

When the radical E is selected from [V—N(Y)]$_n$—V or [V—O]$_x$—V wherein V is a $C_2$-$C_{50}$ linear, branched, cyclic or aromatic hydrocarbon radical, said hydrocarbon radical may be substituted by one or more $C_{1-12}$ linear, branched, cyclic or aromatic group(s). Said hydrocarbon radicals and/or groups may optionally be substituted by —OH, —COOH, —COOR', —F, —Br, —Cl, —I, —OR', —SO$_3$H, —SO$_3$R' or —SR' moieties wherein R' is a $C_{1-12}$ linear, branched, cyclic or aromatic hydrocarbon radical.

In preferred embodiments of compound (i) X or Y are different from ZPO$_3$M$_2$ when W is ZPO$_3$M$_2$. In another preferred execution X is [V—N(K)]$_n$—K or [V—N(Y)]$_n$—V with V being a $C_2$-$C_4$ linear or branched hydrocarbon radical, when z=0 and a=1. In yet another preference, W and K are ZPO$_3$M$_2$ when X is [V—O]$_x$—V. In other preferred executions, z is equal to or smaller than half the number of carbon atoms in X. In another preference W and Y are [V—N(K)]$_x$—K or [V—N(Y)]$_n$—V when X is a $C_1$-$C_{50}$ alkyl chain substituted by COOH, COOG, SO$_3$H, SO$_3$G, OG, SG, OH, F, Br, Cl or I groups.

Preferred compounds (i) comprise alkylene polyamino polyphosphonic acids and their salts, preferably with the formula M$_2$O$_3$P—CH$_2$—N(R$^1$)—(CH$_2$)$_m$—N(R$^2$)—CH$_2$—PO$_3$M$_2$ wherein R$^1$ and R$^2$ are independently selected from —CH$_2$PO$_3$M$_2$ or —(CH$_2$)$_n$—N—(CH$_2$PO$_3$M$_2$)$_2$ wherein m=2 to 6, preferably 2 or 3, and n is 2 or 3. Suitable alkylene polyamino polyphosphonic acids and their salts are ethylenediamine tetra(methylene phosphonic acid), and preferably its alkali salts, especially sodium salts, hexamethylenediamine tetra(methylene phosphonic acid) and preferably its alkali salts, especially potassium salts, diethylenetriamine penta(methylene phosphonic acid) and preferably its alkali salts, especially sodium salts. Preferred components (I) of the formula (i) (X)$_a$[N(W)(ZPO$_3$M$_2$)$_{2-a}$]$_z$ further comprise amino polyphosphonic acids and their salts, especially with X=$C_1$-$C_8$ hydrocarbon radical, W=X or ZPO$_3$M$_2$ and Z=$C_1$-$C_4$ alkylene chain, such as amino tris(methylene phosphonic acid) N(CH$_2$PO$_3$H$_2$)$_3$ ("ATMP"), and its salts, preferably alkali salts, especially sodium salts.

The compound (i) and (iv) aminoalkylene phosphonic acid group and its salts can preferably be selected from the group of: ethylene diamine tetra(methylene phosphonic acid); diethylenetriamine penta(methylene phosphonic acid); 1,3-propane diamine-N,N'-bis(2-aminoethyl)hexa(methylene phosphonic acid); L-lysine-N,N,N',N'-tetra(methylene phosphonic acid); L-alanine-N,N-di(methylene phosphonic acid); poly((propyl or ethyl) imino bis(methylene phosphonic acid)) substituted polyethylene imine; glycine N,N-bis(propyl or ethyl imino bis(methylene phosphonic acid)); alanine N,N-bis(propyl or ethyl imino bis(methylene phosphonic acid)); β-alanine N,N-bis(propyl or ethyl imino bis(methylene phosphonic acid)); glutamic acid N,N-bis(propyl or ethyl imino bis(methylene phosphonic acid)); 4-aminomethyl 1,8-octane diamino hexa(methylene phosphonic acid); 6-amino hexanoic acid N,N-bis(propyl or ethyl imino bis(methylene phosphonic acid)); 9-amino nonanoic acid N,N-bis(propyl or ethyl imino bis(methylene phosphonic acid)); 11-amino undecanoic acid N,N-bis(propyl or ethyl imino bis(methylene phosphonic acid)); 12-amino dodecanoic acid N,N-bis(propyl or ethyl imino bis(methylene phosphonic acid)); poly(vinylamino bis(methylene phosphonic acid)); and poly(vinylamino N,N-bis(propyl or ethyl imino bis(methylene phosphonic acid))).

In another approach preferred compound (i) and (iv) amino alkylene phosphonic acid groups and its salts can be selected from the group of: 4-amino butanoic acid N,N-bis(propyl or ethyl imino bis(methylene phosphonic acid)); methionine N,N-bis(propyl or ethyl imino bis(methylene phosphonic acid)); L-lysine N,N,N',N'-tetra(propyl or ethyl imino bis(methylene phosphonic acid)); aspartic acid N,N-bis(propyl or ethyl imino bis(methylene phosphonic acid)); phenylalanine N,N-bis(propyl or ethyl imino bis(methylene phosphonic acid)); threonine N,N-bis(propyl or ethyl imino bis(methylene phosphonic acid)); 2-ethanol amine N,N-bis(propyl or ethyl imino bis(methylene phosphonic acid)); 6-hexanol amine N,N-bis(propyl or ethyl imino bis(methylene phosphonic acid)); 4-butanol amine N,N-bis(propyl or ethyl imino bis(methylene phosphonic acid)); di(2-ethanol)amine(propyl or ethyl imino bis(methylene phosphonic acid)); dipropanol amine(propyl or ethyl imino bis(methylene phosphonic acid)); 2-(2-aminoethoxy)ethanol bis(propyl or ethyl imino bis(methylene phosphonic acid)); 3-propanol amine bis(propyl or ethyl imino bis(methylene phosphonic acid)); toluene diamine tetra(propyl or ethyl imino bis(methylene phosphonic acid)); 1,6-hexamethylene diamine tetra(propyl or ethyl imino bis(methylene phosphonic acid)); 1,4-butane diamine tetra(propyl or ethyl imino bis(methylene phosphonic acid)); 1,2-ethylene diamine tetra(propyl or ethyl imino bis(methylene phosphonic acid)); linear or branched polyethylene imine poly(propyl or ethyl imino bis(methylene phosphonic acid)); methyl or ethyl or propyl or butyl or hexyl or heptyl or octyl or nonyl or decyl or dodecyl amine bis(propyl or ethyl imino bis(methylene phosphonic acid)); aniline bis(propyl or ethyl imino bis(methylene phosphonic acid)); $C_{12-22}$ fatty amine bis(propyl or ethyl imino bis(methylene phosphonic acid)); thioglycolic acid S-(propyl or ethyl imino bis(methylene phosphonic acid)); cysteine S,N,N-tri(ethyl or propyl imino bis(methylene phosphonic acid)); methyl(propyl or ethyl imino bis(methylene phosphonic acid)) thioether; ethyl or propyl or pentyl or hexyl or octyl or phenyl or naphthyl or decyl or dodecyl(propyl or ethyl imino bis(methylene phosphonic acid)) thioether; propanoic acid 3-oxy(propyl or ethyl imino bis(methylene phosphonic acid)); butanoic acid 4-oxy (propyl or ethyl imino bis(methylene phosphonic acid)); pentanoic acid 5-oxy(propyl or ethyl imino bis(methylene phosphonic acid)); acetic acid 2-oxy(propyl or ethyl imino bis (methylene phosphonic acid)); tartaric acid O,O'-bis(propyl or ethyl imino bis(methylene phosphonic acid)); hydroxysuccinic acid O-(propyl or ethyl imino bis(methylene phosphonic acid)); butyric acid α-oxy-(propyl or ethyl imino bis(methylene phosphonic acid)).

Compounds (ii) having the formula D-[C(OH)(PO$_3$H$_2$)$_2$]$_y$ are preferably alkylene polyphosphonic acids and their salts, which can, in one preference, be represented by species of the formula 1-hydroxyalkylene 1,1-diphosphonic acid wherein the alkyl group is selected from $C_{2-10}$, more preferably $C_{2-6}$, in one particular execution 1-hydroxyethylene 1,1-diphosphonic acid (H$_2$O$_3$P)$_2$—C(OH)—CH$_3$, ("HEDP"), preferably its alkali salts, especially sodium salts. In another preference, D in compound (ii) being alkylene phosphonic acid is [V—O]$_x$—V with V being selected from $C_{2-10}$ linear or branched hydrocarbon radicals and with x being from 1-50.

A preferred phosphono-alkane-polycarboxylic acid and its salts of compound (iii) is 2-phosphonobutane 1,2,4-tricarboxylic acid HO$_2$C—CH$_2$—C(CO$_2$H)(PO$_3$H$_2$)—(CH$_2$)$_2$—CO$_2$H, and its salts, preferably its alkali salts, especially sodium salts.

The first component (i) aminoalkylene phosphonic acid and its salts, can be manufactured by the known process of converting phosphorous acid—for example resulting from the hydrolysis of phosphorus trichloride PCl$_3$—via the addition of an amine and formaldehyde, wherein the amine has the general formula (X)$_a$[N(W) (H)$_{2-a}$]$_z$ wherein the terms X, N and W have the meaning as stated above. The resulting alkylene phosphonic acids can subsequently be treated with alkali or earth alkali hydroxides or ammonia or amines to thus yield partial or total phosphonate salts. This reaction is generally known and, for example, described in GB 1.142.294 and U.S. Pat. No. 3,288,846.

The non-aminoalkylene phosphonate components (ii) and (iii) can be manufactured by known processes. As an example, when in component (ii) of the formula D-[C(OH)(PO$_3$M$_2$)$_2$]$_y$, D=CH$_3$ said component (ii) can be made by the addition of PCl$_3$ to a mixture of acetic acid and water followed by steam treatment and recovery of unreacted acetic acid by distillation. With regard to manufacturing component (iii) phosphono-alkane-polycarboxylic acid the synthesis of this class of chemicals can be exemplified by 2-phosphonic acid butane 1,2,4-tricarboxylic acid (HOOC—CH$_2$—C(PO$_3$H$_2$)(COOH)—CH$_2$—CH$_2$COOH). This chemical can be synthesized by the reaction of dimethylmaleate with dimethylphosphite followed by the reaction of the adduct product with methyl acrylate in the presence of sodium methoxide and terminated by the four ester groups hydrolysis to the corresponding free acid groups.

Examples of compounds (iv) are compounds of the formula [H$_2$O$_3$P(CH$_2$)]$_2$N(CH$_2$)$_m$CH{(CH$_2$)$_n$N[(CH$_2$)PO$_3$H$_2$]$_2$} {(CH$_2$)$_p$N[(CH$_2$)PO$_3$H$_2$]$_2$} wherein m, n and p are, for example, 1, 2, 3 or 4, such as 4-aminomethyl 1,8-octanediamine hexa(methylene phosphonic acid) and its corresponding salts, wherein m=3, n=4, and p=1, and which can be prepared starting from NH$_2$—(CH$_2$)$_3$—CH(CH$_2$)$_4$—NH$_2$)CH$_2$—NH$_2$ reacting with CH$_2$O, H$_3$PO$_3$, and HCl.

The weight ratio of the first component (I) to the second component (II) can be chosen in a broad range, but generally is in the range of from 20:1 to 1:6, preferably of from 10:1 to 1:4, more preferably of from 8:1 to 1:3.

Fructans used as starting material for producing the carboxylated fructans used as component (II) are oligo- and polysaccharides which have a majority of anhydrofructose units, and can have a polydisperse chain length distribution and can be of straight- or branched-chain. Preferably the fructan contains mainly beta-2,1 bonds, as in inulin. The fructans used as starting material for producing component (II) can be products obtained directly from a vegetable source or other sources as well as products in which the average chain length has been modified, increased or reduced, by fractionation, enzymatic synthesis or hydrolysis.

Carboxylated fructans with modified average chain length, and suitable for use as component (II) in accordance with the inventive technology, can be made from fructans with enzymatically increased chain length, fructan hydrolysis products having shortened chains and fractionated products having a modified chain length. Fractionating of fructans such as inulin can be achieved, for example, by means of known techniques including low temperature crystallization (see WO 96/01849), column chromatography (see WO 94/12541), membrane filtration (see EP-A-0440074, EP-A-0627490) or selective precipitation with alcohol. Hydrolysis to yield shorter fructans can be carried out, for example, enzymatically (endo-insulase), chemically (water and acid) or by heterogeneous catalysis (acid column). Reduced, oxidized, hydroxyalkylated and/or crosslinked fructans can also represent suitable starting materials to produce the carboxylated fructans used as component (II). The fructans have an average chain length (degree of polymerization, DP) of at least 3 to about 1000. Preferably, the average chain length is from 3 to 60, in particular of from 5 to 30 monosaccharide units. A preferred fructan is inulin (beta-2,1-fructan) or a modified inulin.

In preferred embodiments of the invention the fructan component (II) of the composition is carboxymethylinulin and/or carboxyethylinulin, preferably with a degree of substitution (DS) in the range of from 1.5 to 2.8, and/or dicarboxyinulin having a degree of oxidation (DO) of from 20 to 90%, expressed as a molar percentage of monosaccharide units converted into the corresponding dicarboxy analogues.

Carboxymethylinulin can be prepared by reaction of the fructan with chloroacetic acid as described in WO 95/15984. Carboxyethylinulin can be prepared in accordance with the method of WO 96/34017. The carboxyalkylinulin so prepared can have a degree of substitution (DS) up to 3.0. The DS of such carboxyalkylinulins is generally within the range of from 0.2 to 3.0, preferably from 1.0 to 2.8. Preferred carboxyalkylinulins for use within the claimed technology have a DS in the range of from 1.5 to 2.8, most preferably 1.8 to 2.5.

Dicarboxyinulins can be obtained through oxidation of the inulin raw material. The anhydrofructose units are converted, with ring opening, into dicarboxy(hydroxyethoxy)ethyleneoxy units. The oxidation can proceed in one step with hypohalite, as described in WO 91/17189, or in two steps with periodate and chlorite, as described in WO 95/12619. Preferred degrees of oxidation (DO) are in the range of from 20 to 90%, the DO being the (molar) percentage of monosaccharide units converted into the corresponding dicarboxy analogues.

6-Carboxy inulin is a well known material. It can be obtained by oxidation in accordance with the method of WO 95/07303.

Fructan polycarboxylic acid can be prepared by successive oxidation and carboxyalkylation of the selected starting material. The material has a DO of from 0.2 to 2.0 and a degree of carboxy-alkyl/-acyl substitution of from 0.2 to 3, preferably from 0.5 to 2.5.

According to the method for inhibiting calcium salt scale formation in an aqueous system in a chemical pulping process having a sufficient quantity of available calcium cations and anions selected preferably from carbonate and sulphate to form said calcium salt scale, an effective scale inhibiting amount of the composition described above consisting of at least one phosphonate component (I) and at least one carboxylated fructan component (II), is admixed with the aqueous system in the digester, or with the black liquor, of the chemical pulping process maintained in a certain temperature range, to inhibit calcium salt scale formation, wherein said phosphonate component(s) (I) and fructan component(s) (II) are selected from the respective compounds as defined above. Said temperature range in the digester is generally about 110 to about 180, preferably about 150 to about 175 degree Celsius. A typical temperature range in the black liquor evaporator is generally in the range of about 80 to about 180 degree Celsius, depending on the effect.

The aqueous composition of the invention can be added to the digester or to the black liquor recovered from the digester using any conventional means known to those of ordinary skill in the art. In addition, the aqueous composition of the invention can be added directly to the digesting composition or it can be introduced into one of the aqueous feed compositions being charged to the digester prior to charging of that aqueous feed composition, or directly to the black liquor prior to the black liquor recovery stage, e.g. prior to the black liquor evaporator, or it can be added to the black liquor during the black liquor recovery stage, e.g. between effects of the MEE. The pH of the digester of an alkaline pulping process is at least 9. In the case of a Kraft process, the pH in the digester is preferably about 10 to about 14, and more, preferably about 12 to about 14. The pH of the black liquor in an alkaline chemical pulping process is at least 9. In case of a Kraft process, the pH of the black liquor is typically about 10 to about 14, and more typically about 12 to 14.

The aqueous composition of the invention can be added in a batch digester or to the black liquor in any conventional manner known to one of ordinary skill in the art. For example, in a batch digester operation, the addition of the aqueous composition of the invention can be a bulk addition at the beginning of the digester cook cycle, or at the beginning of the black liquor recovery stage, respectively, or during the digester cook cycle, or the during the black liquor evaporator cycle, respectively, or it can be added in multiple charges throughout the digestion cycle or black liquor evaporator cycle, respectively, or continuously through the digester cook cycle or as the black liquor is recovered.

It is currently preferred to add the aqueous composition of the invention as a bulk charge to the digester at or near the beginning of the digester cook cycle or to the black liquor at or near the beginning of the black liquor evaporation cycle. In the case of a continuous digester operation, the addition of the aqueous composition of the invention will typically be added continuously to the digester or to the black liquor, respectively, to maintain the effective concentration of said composition in the digester or black liquor, respectively. If the black liquor is held in a storage vessel prior to the black liquor evaporator stage, the composition of the invention can be added as described above.

The amount of the scale inhibiting composition of this invention employed is an effective amount sufficient to provide an effective scale inhibiting concentration of the composition in the digester or in the black liquor evaporator, respectively, over time at which the formation, deposition and adherence of calcium salt scale, particularly calcium carbonate and calcium sulphate scale, is satisfactorily inhibited in the digester, brown stock washers and/or black liquor recovery area of the particular chemical pulping facility. The appropriate concentration of the components in the composition and of the composition itself for addition to the digester can be readily selected to achieve the desired scale inhibition for the required time based on the disclosure of this specification without undue experimentation work.

The invention is further described in the following Examples which are not intended to limit or restrict the invention. Unless otherwise indicated all quantities are expressed in weight.

EXAMPLE 1

The scale inhibiting composition consists of the sodium salt of ethylenediamine tetra (methylene phosphonic acid) as a first component, and carboxymethylinulin having DS of 2.5 as the second component.

Methodology: Kraft cooks were carried out in an MK Systems (Danvers, Mass.) 6 L digester on which an extractor port and condenser were added to allow samples to be pulled while the system was under pressure. Conditions used in the Kraft cook included liquor to wood ratio of 5:1, 18.5% effective alkali, 25% sulfidity and variable levels of $Na_2CO_3$, with 5 g/L being the most frequently tested concentration. Prior to each Kraft cook, a 10% (v/v) aqueous solution of $H_2SO_4$ was circulated in the digester for 10 minutes to remove any existing deposits. This acid solution was drained and the digester was rinsed several times with deionised water. Four liters of white liquor (described above) were added to the digester and the initial temperature was recorded. Eight-hundred grams of the oven dried pine wood chips were then placed in the digesters chip basket and submerged into the liquor. When the basket was in place, the stopwatch was started, a sample (≈5 ml) was drawn from the digester and the reaction heating sequence was initiated. A liquor sample was drawn every 15 minutes using the water cooled condenser, which had a total volume of less than 10 mL. The condenser was completely purged prior to each sampling. One milliliter of the drawn sample was quantitatively transferred to a 15-mL centrifuge tube with 5 ml of 4% HCl solution. Approximately 3-mL of the remaining sample were drawn into a 10-mL disposable syringe and passed through a syringe filter (0.45-µm pore size membrane). One milliliter of the filtrate was quantitatively transferred to another 15-mL centrifuge tube containing 5 mL of 4% HCl solution. The acid in test tubes precipitated the black liquor lignin. Centrifugation of the test tubes then produced a clear supernatant. A PerkinElmer (Shelton, Conn.) 100 A Analyst Atomic Absorption Spectrometer was used to determine calcium concentrations.

Figure 2:
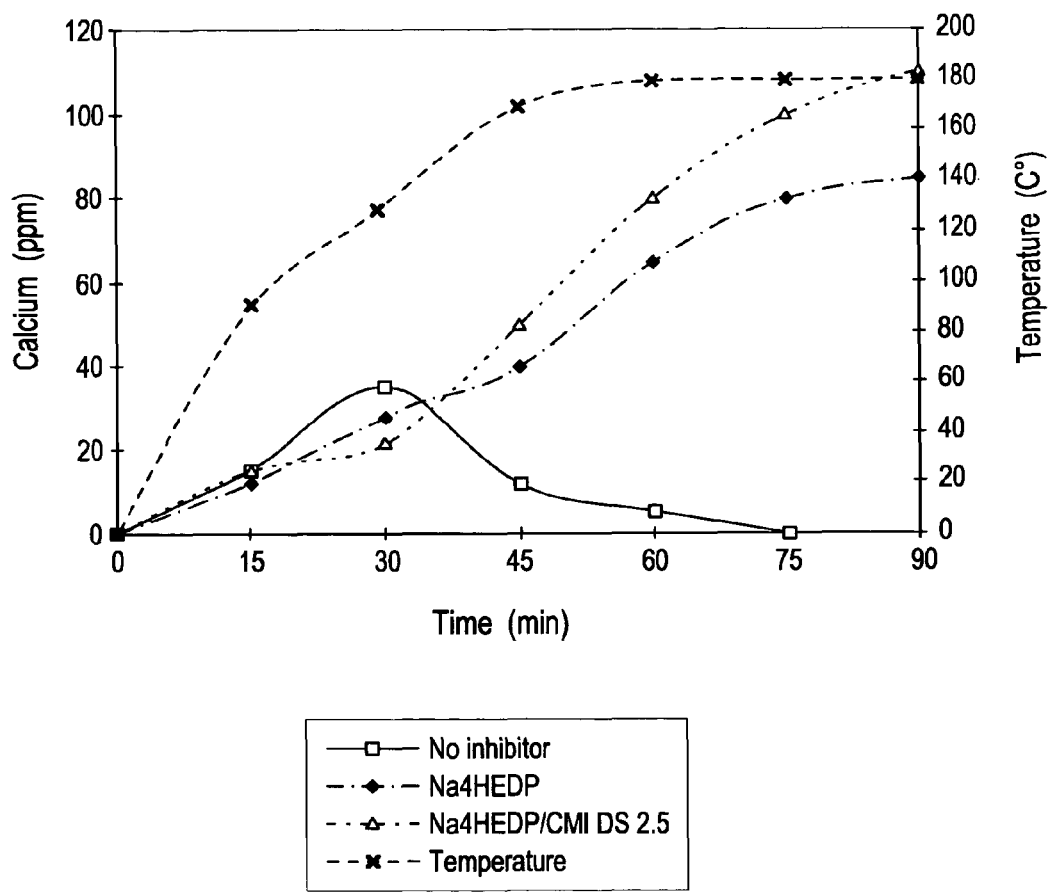
FIG. 2 is a graphical presentation of the results obtained by the procedure of Example 1 indicating the amount of calcium contained in the white liquor of a Kraft digester over time and temperature range of the digestion process wherein the white liquor contains no inhibitor and wherein the white liquor contains 50 ppm of various calcium scale inhibitors.

The results related to the calcium concentration present in the digester dependent on the time are shown in FIGS. 1 and 2.

The curves in FIG. 1 show the results obtained with no scale inhibitor, with Na5EDTMPA (which means the sodium salt of ethylenediamine tetra (methylene phosphonic acid) as the only scale inhibitor, and the mixture of Na5EDTMPA and CMI DS2,5 which means carboxymethylinulin having DS of 2.5.

The curves in FIG. 2 show the result obtained with no scale inhibitor, with Na4HEDP (which means the tetra sodium salt of 1-Hydroxyethylene diphosphonic acid) as the only scale inhibitor, and the mixture of Na4HEDP and CMI DS 2,5 which means carboxymethylinulin having DS of 2.5.

EXAMPLE 2

The scale inhibiting composition consists of the sodium salt of 1-hydroxyethylidene(1,1-diphosphonic acid) as a first component, and carboxymethylinulin having DS of 2.5 as the second component.

Figure 3:
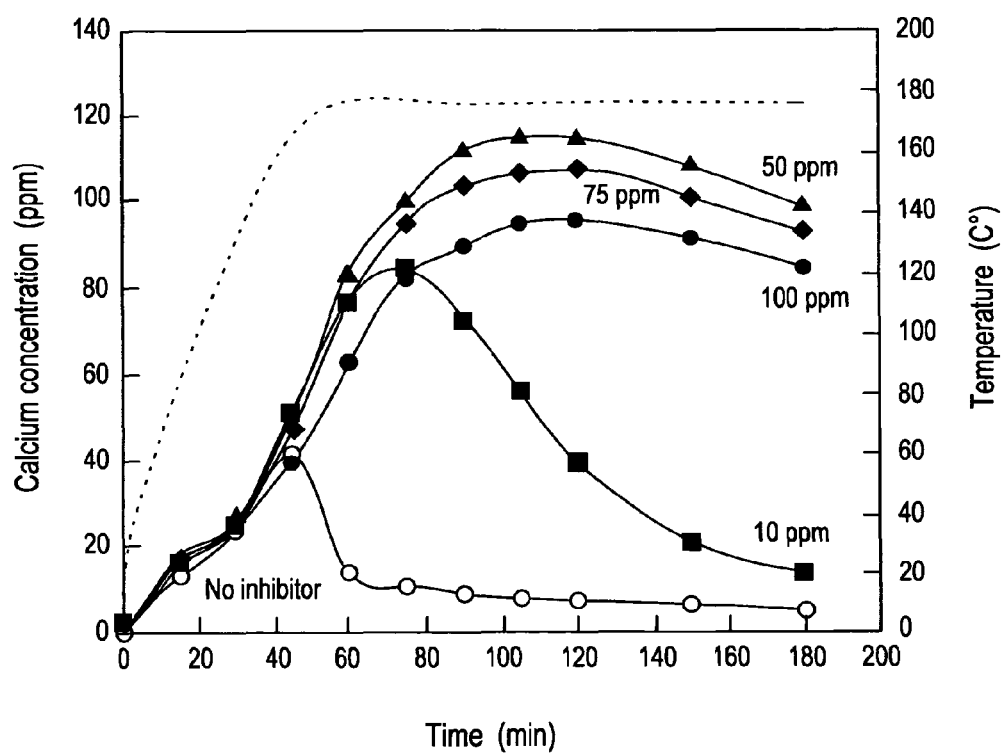
FIG. 3 is a graphical presentation of the results obtained by the procedure of Example 2 indicating the amount of calcium contained in the white liquor of a Kraft digester over time and temperature range of the digestion process wherein the white liquor contains no inhibitor and wherein the white liquor contains various different concentrations of a calcium inhibitor which is a mixture of sodium 1-hydroxyethylidene(1, 1diphosphonic acid) and carboxy methylinulin.

Methodology: Identical to Example 1. The results are shown in FIG. 3.

As can be clearly shown by the laboratory test data and mill trial results described in the Examples, the blended product composed of the specific organo phosphonate component and carboxylated fructan component of the invention, calcium carbonate inhibition is increased by at least 20% when compared with products containing no fructan component. In addition, the test data illustrate a comparable performance between 50 ppm and 100 ppm use levels when the organo phosphonate component is combined with the carboxylated fructan component. What this result illustrates is if a fall off in performance is observed as the use level increased, then due to the addition of carboxylated fructan component the performance fall off is unlikely to occur and rather an increase in performance is observed. This result is important because the organo phosphonates proposed in the prior art indicate a drop in performance for some of the organo phosphonates products. As the use level increases from 50 ppm to 100 ppm, the scale inhibiting composition of the invention will allow higher use concentrations and consequently with improved performance. Furthermore, the use of the carboxylated fructan component in combination with the organo phosphonates of the invention not only increases the anti-scalant performance of the organo-phosphonates, the addition of the carboxylated fructan component improves the heavy metal removal and the efficiency of the downstream washing and bleaching processes.

The invention claimed is:

1. A method for inhibiting calcium salt scale formation in a chemical pulping process comprising adding an effective scale inhibiting amount of a composition to the alkaline aqueous mixture in the digester of said chemical pulping process and/or to the black liquor of a chemical pulping process, said composition consisting of at least one phosphonate component (I) selected from at least one of the compounds (i), (ii), (iii) and (iv), and at least one component (II) consisting of at least one carboxylated fructan compound, wherein compound (i) is at least one aminoalkylene phosphonic acid, or its corresponding aminoalkylene phosphonate salt, selected from compounds having the general formula $(X)_a[N(W)(Y)_{2-a}]_z$ wherein X is selected from $C_1$-$C_{200,000}$, linear, branched, cyclic or aromatic hydrocarbon radicals which radicals are optionally substituted by one or more or more $C_1$-$C_{12}$ linear, branched, cyclic or aromatic groups (which radicals and/or groups are) optionally substituted by OH, COOH, COOG, F, Br, Cl, I, OG, $SO_3H$, $SO_3G$ and SG moieties; $ZPO_3M_2$; $[V-N(K)]_n-K$; $[V-N(Y)]_n-V$ or $[V-O]_x-V$; wherein V is a $C_{2-50}$ linear, branched, cyclic or aromatic hydrocarbon radical, optionally substituted by one or more $C_{1-12}$ linear, branched, cyclic or aromatic groups (which radicals and/or groups are) optionally substituted by OH, COOH, COOR', F, Br, Cl, I, OR', $SO_3H$, $SO_3R'$ or SR' moieties, wherein R' is a $C_{1-12}$ linear, branched, cyclic or aromatic hydrocarbon radical, wherein G is selected from $C_1$-$C_{200,000}$, linear, branched, cyclic or aromatic hydrocarbon radicals, optionally substituted by one or more $C_1$-$C_{12}$ linear, branched, cyclic or aromatic groups (which radicals and/or which groups are) optionally substituted by OH, COOH, COOR', F, Br, Cl, I, OR', $SO_3H$, $SO_3R'$ and SR' moieties; $ZPO_3M_2$; $[V-N(K)]_n-K$; $[V-N(Y)]_n-V$ or $[V-O]_x-V$; wherein Y is $ZPO_3M_2$, $[V-N(K)]_n-K$ or $[V-N(K)]_n-V$; and x is an integer from 1-50,000; z is from 0-200,000, whereby z is equal to or smaller than the number of carbon atoms in X, and a is 0 or 1; n is an integer from 0 to 50,000; z=1 when a=0; and X is $[V-N(K)]_n-K$ or $[V-N(Y)]_n-V$ when z=0 and a=1; Z is a $C_{1-6}$ alkylene chain; M is selected from H and from alkali, earth alkali, ammonium, and protonated amine ions; W is selected from H, X and $ZPO_3M_2$; K is $ZPO_3M_2$ or H whereby K is $ZPO_3M_2$ when z=0 and a=1 or when W is H or X;

with the proviso that the aminoalkylene phosphonic acid (and its corresponding aminoalkylene phosphonate), contains, at least, two phosphonic acid (or corresponding phosphonate) groups;

wherein compound (II) is at least one alkylene phosphonic acid, or its corresponding alkylene phosphonate, having the formula:

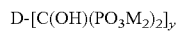

D-[C(OH)(PO$_3$M$_2$)$_2$]$_y$, wherein D is selected from $C_{1-100}$ linear, branched, cyclic or aromatic hydrocarbon chain, optionally substituted by a $C_{1-12}$ linear, branched, cyclic or aromatic group (which chain and/or which group can be) optionally substituted by $SO_3H$, $SO_3J$, COOJ, OJ and SJ moieties; or $[V-O]_x-V$ wherein V is a $C_2$-$C_{50}$ linear, branched, cyclic or aromatic hydrocarbon radical, optionally substituted by one or more $C_1$-$C_{12}$ linear, branched, cyclic or aromatic groups (which radicals and/or groups are) optionally substituted by $SO_3H$, $SO_3R'$, COOR', OR' or SR' moieties wherein J is selected from $C_1$-$C_{100}$ linear, branched, cyclic or aromatic hydrocarbon radicals, optionally substituted by one or more $C_1$-$C_{12}$ linear, branched, cyclic or aromatic groups (which radicals and/or groups can be) optionally substituted by $SO_3H$, $SO_3R'$, COOR', OR' or SR' wherein R' is a $C_{1-12}$ linear, branched, cyclic or aromatic hydrocarbon chain and x is an integer from 1-50,000; y is an integer from 1-50 whereby y is equal or smaller then the number of carbon atoms in D; and M is selected from H and from alkali, earth alkali, ammonium ions, and protonated amine ions, wherein compound (iii) is selected from at least one phosphono-alkane-polycarboxylic acids and its corresponding salts based on alkali, earth alkali, ammonium, and protonated amine ions, wherein the alkane moiety is a $C_{3-20}$ linear, branched, cyclic or aromatic hydrocarbon chain and wherein the molar ratio of phosphonic acid radical to carboxylic acid radical is in the range of from 2:3 to 1:7, wherein compound (iv) is selected from at least one linear or branched hydrocarbon chains having from 6 to 2,000,000 carbon atoms containing amino groups substituted by $ZPO_3M_2$, and/or -E-N(W)(Y), with respect to the hydrocarbon chain, in either terminal or branched positions whereby the molar ratio of the aminoalkylene phosphonic acid substituents to the number of carbon atoms in the hydrocarbon chain is in the range of from 2:1 to 1:40 whereby at least 30% of the available NH/NH$_2$ functionalities have been converted into the corresponding aminoalkylene phosphonic acid and/or into -E-N(W)(Y) substituted groups and wherein the alkylene moiety is selected from $C_{1-6}$; wherein E is selected from $C_1$-$C_{2,000}$ linear, branched, cyclic or aromatic hydrocarbon radicals, optionally substituted by one or more $C_1$-$C_{12}$ linear, branched, cyclic or aromatic groups (which radicals and/or which groups can be) optionally substituted by OH, COOH, COOL, F, Br, Cl, I, OL, $SO_3H$, $SO_3L$ and SL moieties; $[V-N(Y)]_n-V$ or $[V-O]_x-V$ wherein V is a $C_{2-50}$ linear, branched, cyclic or aromatic hydrocarbon radical, optionally substituted by one or more $C_{1-12}$ linear, branched, cyclic or aromatic groups (which radicals and/or groups are) optionally substituted by OH, COOH, COOR', F, Br, Cl, I, OR', $SO_3H$, $SO_3R'$ or SR' moieties wherein R' is a $C_{1-12}$ linear, branched, cyclic or aromatic hydrocarbon radical; wherein L is selected from $C_1$-$C_{2,000}$ linear, branched, cyclic or aromatic hydrocarbon radicals, optionally substituted by one or more $C_1$-$C_{12}$ linear, branched, cyclic or aromatic groups (which radicals and/ or which groups can be) optionally substituted by OH, COOH, COOR', F, Br, Cl, I, OR', $SO_3H$, $SO_3R'$ and SR' moieties; $ZPO_3M_2$; $[V-N(K)]_n-K$; $[V-N(Y)]_n-V$ or $[V-O]_x-V$; wherein Y is $ZPO_3M_2$, $[V-N(K)]_n-K$ or $[V-N(K)]_n-V$; and x is an integer from 1-50,000; n is an integer from 0 to 50,000; M is selected from H and from alkali, earth alkali, ammonium and protonated amine ions; W is selected from H, E and $ZPO_3M_2$; K is $ZPO_3M_2$ or H whereby K is $ZPO_3M_2$ when W is H or E; with the proviso that the aminoalkylene phosphonic acid (and its corresponding aminoalkylene phosphonate) contains, at least, two phosphonic acid aminoalkylene phosphonic groups (or corresponding aminoalkylene phosphonate groups), wherein the further component (II) consists of a carboxylated fructan component and is selected from the group of (a) carboxyalkylfructan having from 1 to 4 carbon atoms in the alkyl moiety, (b) dicarboxyfructan having a degree of oxidation (DO) of from 10 to 100% expressed as a molar percentage of monosaccharide units converted into the corresponding dicarboxy analogues, (c) 6-carboxyfructan, and/or (d) fructan polycarboxylic acid, having a degree of carboxyalkylation or carboxyacylation of from 0.2 to 3.0, or (e) mixtures thereof,
wherein the weight ratio of the first component(s) (I) to the second component(s) (II) in the composition to be added to the alkaline aqueous mixture in the digester of said chemical pulping process or to the black liquor of a chemical pulping process is in the range of from 20:1 to 1:6.

2. The method as claimed in claim 1, wherein the phosphonate component (I) is selected from alkylene polyamino polyphosphonic acids and their salts, polyphosphonic acids and their salts, and alkylene polyphosphonic acids and their salts.

3. The method as claimed in claim 1, wherein the phosphonate component (I) is selected from $M_2O_3P-CH_2-N(R^1)-(C_2)_m-N(R^2)-CH_2-PO_3M_2$ and its salts, wherein $R^1$ and $R^2$ are independently selected from $-CH_2PO_3M_2$ and $-(CH_2)_n-N-(CH_2PO_3M_2)_2$ wherein m=2 to 6, and n is 2 or 3.

4. The method as claimed in claim 1, wherein the phosphonate component (I) is selected from amino polyphosphonic acids and their salts selected from compounds (I) with the formula $(X)_a[N(W)(ZPO_3M_2)_{2-a}]_z$ with X=$C_1$-$C_8$ hydrocarbon radical, W=X or $ZPO_3M_2$ and Z=$C_1$-$C_4$ alkylene chain.

5. The method as claimed in claim 1, wherein X or Y in compound (i) are different from $ZPO_3M_2$ when W is $ZPO_3M_2$, and W and K are $ZPO_3M_2$ when X is $[V-O]_x$.

6. The method as claimed in claim 1, wherein X in compound (i) is represented by $[V-N(K)]_xK$ or $[V-N(Y)]_n-V$, with V being a $C_{2-4}$ linear or branched hydrocarbon radical when z=0 and a=1.

7. The method as claimed claim 1, wherein W and Y in compound (i) are selected from $[V-N(K)]_xK$ or $[V-N(Y)]n-V$ when X is a $C_{1-50}$ alkyl chain substituted by COOH, COOG, $SO_3H$, $SO_3G$, OG, SG, OH, F, Cl, Br or I groups.

8. The method as claimed in claim 1, wherein the phosphonate component (I) is selected from ethylenediamine tetra (methylene phosphonic acid) and its salts, hexamethylenediamine tetra (methylene phosphonic acid) and its salts, diethylenetriamine penta(methylene phosphonic acid) and its salts, amino tris(methylene phosphonic acid) and its salts, 1-hydroxyethylene (1,1-diphosphonic acid) and its salts, and 2-phosphono 1,2,4-butane tricarboxylic acid and its salts.

9. The method as claimed in claim 1, wherein compound (II) is selected from 1-hydroxyalkylene 1,1-diphosphonic acid and its salts wherein the alkylene group is selected from $C_2$-$C_{10}$, linear or branched hydrocarbon radicals or from $[V-O]_x-V$ with V being $C_{2-10}$ and with x being 1-50.

10. The method as claimed in claim 1, wherein the carboxylated fructan component (II) is selected from carboxyalkylinulin having from 1 to 4 carbon atoms in the alkyl moiety, dicarboxylnulin, having a degree of oxidation of from 10 to 100%, expressed as a molar percentage of monosaccharide units converted into the corresponding dicarboxy analogues, 6-carboxylnulin, and inulin polycarboxylic acid, having a degree of carboxyalkylation or carboxyacylation of from 0.2 to 3.0, and mixtures thereof.

11. A method for inhibiting calcium salt scale formation in an aqueous system in a selected alkaline chemical pulping process by adding a composition as described in claim 1 comprising at least one of said phosphonate components (I) and at least one of said carboxylated fructan components (II), comprising the following steps:
(a) determining the calcium salt scale inhibition profiles of the concentration of said composition and the amounts of its components consisting of at least one of said phosphonate components, and, further, at least one of said carboxylated fructan components and the process temperature as a function of time for said composition admixed with the aqueous digesting composition in a chemical pulping process digester, or with the black liquor composition recovered from the digester of said chemical pulping process,
(b) identifying the calcium salt scale inhibition capability required by said selected chemical pulping process based on the process operating conditions of time, temperature and pressure, and the aqueous digesting composition, or the black liquor composition, respectively,
(c) selecting the appropriate components of the composition, their amounts in the composition and use concentration of the composition to effectively inhibit calcium salt scale formation in said selected alkaline chemical pulping process when said composition is admixed with the aqueous digesting composition, or with the black liquor composition recovered from the digester, respectively, of said selected alkaline chemical pulping process based on steps (a) and (b), and
(d) admixing the selected composition according to claim 1 with the aqueous digesting composition during the digestion stage, or with the black liquor composition during the black liquor recovery stage of the chemical pulping process, respectively, in said alkaline chemical pulping process.

12. A method for inhibiting calcium salt scale formation in an aqueous system in a selected alkaline chemical pulping process by adding a composition according to claim 1 comprising at least of one of said phosphonate components (I) and at least one of said carboxylated fructan components (II), comprising the following steps:
(a) identifying the calcium salt scale inhibition capability required by said selected chemical pulping process based on the process operating conditions of time, temperature and pressure, and the aqueous digesting composition, or the black liquor composition, respectively,
(b) selecting the appropriate components of the composition, their amounts in the composition and use concentration of the composition to effectively inhibit calcium salt scale formation in said selected alkaline chemical pulping process when said composition is admixed with the aqueous digesting composition, or with the black liquor composition recovered from the digester, respectively, of said selected alkaline chemical pulping process based on steps (a), and the calcium salt scale inhibition profiles of the concentration of the selected composition and the amounts of its components and the process temperature as a function of time for said selected composition admixed with the aqueous digesting composition, or with the black liquor composition recovered from the digester of said chemical pulping process, respectively, and
(c) admixing the selected composition of phosphate component(s) and carboxylated fructan component(s) according to claim 1 with the aqueous digesting composition, or with the black liquor composition recovered from the digester, respectively, in said selected alkaline chemical pulping process, during the digestion stage of the chemical pulping process, or during the black liquor recovery stage of the chemical pulping process, respectively.

13. A process for making paper pulp, comprising the steps of converting plant fibers into chips, converting the chips into pulp in a chemical pulping process in an alkaline, aqueous system in a digester, admixing an effective scale inhibiting amount of a composition with the aqueous system and/or with the black liquor recovered from the digester, wherein the composition is a composition according to claim 1.

14. A composition for inhibiting calcium salt scale formation in an aqueous system in an alkaline chemical pulping process said composition consisting of at least one component (I) selected from one of the compounds (i), (ii), (iii) and (iv), and at least one component (II) consisting of one of said carboxylated fructan compounds (a), (b), (c), (d) or (e), according to claim 1.

\* \* \* \* \*